Dec. 20, 1932.   W. F. DREW   1,891,802
OVEN
Filed Feb. 2, 1929   6 Sheets-Sheet 1

INVENTOR
Wm F. Drew

Dec. 20, 1932.   W. F. DREW   1,891,802
OVEN
Filed Feb. 2, 1929   6 Sheets-Sheet 4

Dec. 20, 1932.  W. F. DREW  1,891,802
OVEN
Filed Feb 2, 1929   6 Sheets-Sheet 5

INVENTOR
Wm F. Drew

Patented Dec. 20, 1932

1,891,802

UNITED STATES PATENT OFFICE

WILLIAM F. DREW, OF LOS ANGELES, CALIFORNIA

OVEN

Application filed February 2, 1929. Serial No. 337,089.

This invention relates primarily to ovens commercially known as the revolving or reel type embodying a baking chamber and a revolving reel mounted therein provided with shelves or trays for the reception of materials to be processed, such as baking, by the application of heat.

The primary objects of this invention relate to improvements in ovens of this type whereby the generation and application of heat and the elimination of resultant gases produce a uniformly and thoroughly heat saturated relatively quiescent heat transferring medium. By the novel means employed to produce this medium; baking, roasting, drying and all processes involving the application of heat, are effected in a highly efficient and desirable manner. In the instance of baking; tests of the oven's baking qualities have proven that heat permeation, resultant "color" and residual moisture content are conserved in a highly satisfactory degree in bakery products.

The principal object of this invention is to produce an oven wherein the heat source, as by means of gas burners, is generated and applied at the bottom of the oven chamber in such a manner that the auxiliary air for combustion of the heating element, as gas, and the resultant heat are so controlled as to be evenly admitted and applied. To further positively effect an equalized temperature and retentive zone, for purposes later defined, in a definite predetermined portion of the heated oven chamber, the venting of the gases of combustion and those evolved by the materials processed, as baked, dried, etc., is effected by means of a vent positioned in the lower portion of the oven chamber. The effect of so positioning the vent produces two zones of application of the heated medium to the materials processed; in the upper portion of the oven chamber, that above the vent, the application of the heated medium is rendered as that of a reservoir or zone of a uniformly and thoroughly heat saturated relatively quiescent heated medium, while in the lower portion of the oven chamber, that below the vent, application of the heated medium occurs as "live" heat, involving convection currents. It is evident that the desired relative proportion of the two zones of application, differentiated by the vent, are determined by the position of the vent relative to the desired results to be obtained in various processes of heat transfer application for various uses. It is evident that, as cogently instanced by the process of drying, the heated medium with its moisture content may be retained or evacuated as required by the nature of the material processed and the result desired by the differentiating position of the vent. Above the vent, conservation is effected whereas below the vent evacuation by convection is obtained. In simple instance it is further evident that in the process of baking, in the instance of bread, retention of the heated medium with a moisture content, as that evolved from the bread, effects the desirable "soft" crust. It is also apparent that retention of a thoroughly and uniformly heat saturated medium for transference of heat to the material to be processed produces uniform permeation.

For brevity in further description; the objects, merits and specification will be limited to define a bake oven. The description and drawings illustrate the preferred form of my invention but it is not intended to limit the invention to this particular embodiment, as various changes of form, alterations and substitutions may be resorted to without departing from or sacrificing any of the advantages of the invention, the scope of which is defined in the claims appended.

In the form shown the objects above described are produced by locating the burners, mounted in the manner later described, in the bottom of the oven and by positioning the vent or outlet in the required position, differentiating the required zones above described, in the back of the oven near the bottom. By this means the heat transferring medium, as air, in the major baking zone of the oven is heated principally by radiation and conduction and the convection currents enter but slightly into the transfer of heat to this zone from the burner zone. The result is that the baking zone is heated very uniformly with a noticeable absence of stratas or bands of different temperatures. This produces an even bake in all parts of the oven with a very uniform color of all the product. In addition to this the gas consumption is very low with this arrangement resulting in an economical as well as a uniform bake.

Another important object of this invention is to provide a perforated false bottom located beneath the burners for the purpose of effecting a uniform admission of auxiliary air. In the preferred form this false bottom consists of a plurality of "tunnels" with control shutters on the front of the tunnels. These tunnels are so perforated as to deliver the auxiliary air directly under each burner where it is immediately heated before it progresses into the oven. In this way there are no drafts of cold air in the oven tending to chill the articles being baked or producing an uneven heat distribution within the oven. This construction adds materially to the fuel economy as well as to uniform bake and color of the finished product. In addition to this the tunnels act as an insulation between the oven and the floor and prevent the escape of heat as well as adding to the safety of the installation.

Another principal object of this invention is to provide an oven having means, incorporated in the oven structure, for carrying off all hot gases which may leak around the door or which escape from the oven when the door is opened. This feature adds materially to the comfort as well as protecting the health of the baker. When he opens the oven door he is not compelled to stand in a stream of very hot gas nor does he have to breathe the hot gases and the very poisonous carbon monoxide fumes as he is bound to do in the ordinary type oven with the exhaust hood built over the top of the oven or other auxiliary means provided to remove the hot gases and fumes after they have escaped into the room.

Another object of this invention is to provide an oven of the type described having a door which is always convenient, safe and simple to operate and pleasing in appearance. This is accomplished by providing a trunnioned counterweighted door mounted to move substantially vertically from open to closed position. This door is provided with an auxiliary sill at its upper edge which overlies the lower edge of the opening when the door is open for the purpose of providing a surface, out of sight when the door is closed, for receiving the wear due to "rapping" of pans. The front of the door and this auxiliary sill are kept cool by a constant stream of air drawn across them into the stack. This makes it possible to operate the door and to load or unload the oven without inconvenience or danger of being burned that is always present in the usual type of oven.

Another object of this invention is to provide an oven of the type described having the control, adjustment and regulation of all the burners located at a central point. This makes the operation of the oven very convenient and provides an arrangement very well adapted to the addition, at any time, of a thermostatic control of the burners. By providing a master valve for the operative control of the burners and an adjustment so that they always burn with the same relative consumption, the oven can be operated under the best possible conditions of flame and heat distribution at all times.

A principal object of this invention is to provide an oven of the type described which will be readily assembled or dismantled and reassembled. This is done by making the inner or heat retaining walls of the oven in the form of unit sections or panels filled with an insulating material. The outer walls are made in the form of panels, spaced from the inner walls for the purpose later described. By using this construction the insulating panels may be made and filled in the shop and the entire oven assembled in place without causing the usual littering of the bakery incidental to erecting an oven on the job and then filling the space with insulating material or "facing" the heat retaining walls with an insulating material.

An important object of this invention is to provide a new and improved joint for the metal sheets which are assembled to form the wall panels of an oven or other similar structure, and are also used to subsequently secure the adjacent panels together into a complete structure. This new type of joint makes the fabrication of the panels in the shop very simple and economical and provides a very neat, satisfactory and economical means of securing the adjacent panels together. In addition this type of joint provides ready means for expansion and contraction of the structure but maintains it gas tight at all times. This has been very hard to accomplish economically with any of the present usual structures which have to employ expensive packing strips and expansion strips to accomplish this result.

Other objects and advantages will be apparent from the following specifications and claims.

The general idea of the oven may be embodied in many forms and, while I have illustrated my oven as being constructed with a pan reel revolving about a horizontal shaft, it may be made with a circular pan tray or shelf revolving on a vertical shaft or in any other way that suggests itself.

My novel features apply equally well to any type of oven even though it were a simple type not using any reel at all. In the illustrated embodiment of my invention I have shown the bake oven of the most common type having a reel revolving continuously about a horizontal shaft and being loaded and unloaded on the "fly" as the trays pass the front opening in the oven.

The main body 10 of the oven is a parallelepiped with a polyhedral top 11 and ends 12 to complete the structure. The sides, top and ends are made in the form of sectional panels having an inner sheet metal member 13 and an outer sheet metal member 14. The space between these members is filled with any desired type of insulation 15 such as asbestos fibre, rock wool, diatomaceous earth or any other substance commonly used for preventing the loss of heat. The sections are each complete, a unit in themselves and are prefilled at the factory so that all the litter is eliminated from the place where they are assembled. The sections are secured together by a special joint which will be described in detail later. The end sections may be split horizontally as through the shaft bearings or on the line 16 and the upper sections may be placed or removed as a unit with the top.

A horizontal shaft 17 is journaled in bearings supported by the vertical channel irons or other desired members 18 in the end sections of the oven. This carries the weight directly to the foundation and prevents sagging and buckling of the end sections and misalignment of the shaft. One end 19 of the shaft projects outside the end wall of the oven for attaching any desired form of driving mechanism (not shown) for continuously rotating the shaft.

A spider 20 is secured on the shaft near the inner end walls of the oven and arms 21 radiate from these spiders. The outer ends of each pair of arms is connected by a rod 22. The trays 23 are hung on these rods and are free to rotate about them as the whole assembly slowly revolves about the shaft 17 so that the trays always hang vertically from the rods with the bottom of the tray in a horizontal position.

A roller 24 is provided on one end of each tray and an arcuate guide 25, with flaring ends 26 and 27, is secured to the inside of the oven at one end in such a position that the roller 24 enters the guide as the tray approaches the door of the oven and leaves the guide after the tray has passed the door. In this way the tray is prevented from swinging about its rod as it is being loaded or unloaded and the automatic release of the tray when passing the top of the door opening, free to be tilted inward, prevents a shearing effect should the baker's arm be caught in the process of loading. The general arrangement and mounting of the trays to rotate within the oven is old and common to the art but this particular type of guide is thought to be new and novel.

A rectangular opening 28 is left in the front wall of the oven through which the pans are loaded onto and unloaded from the trays. This opening is closed by a trunnioned counterweighted door 29 which operates on the inside of the oven. The door is built like the oven walls with an inside sheet 30 and an outside sheet 31 enclosing the insulating material 32. The door has two arms 33 secured to its lower edge, one at each end of the door and extending at right angles backward from the door parallel with and adjacent the ends of the oven. These bars are trunnioned or pivoted to the end walls of the oven at 34 in any desired manner. The position of the trunnions or pivots 34 relative to the reel and shelves or trays is such that the arcuate path of motion of the door falls without the path of travel of the trays. In its most simple and effective form, the counterweight consists of a heavy bar 35 uniting the rear ends of the arms 33. As a counteractive force acting upon the door the counterweight is divisible into unit forces applied and acting upon unit members of the structure as the arms 33. When the door is in the closed position the bars 33 are horizontal so that the entire door lies above the pivot point with the top edge farther back than the bottom edge for the purpose only of effecting sufficient space between the top of the opening in the front wall shell to allow the upper portion of the door structure to be housed within the shell when closed. In form the insulated section or panel of the oven wall above the door opening converges downward and inward toward the door opening in the inner or insulating wall for the purpose of providing an ample "space" between the outer shell and the top of the opening in the insulating wall or wall proper. The space thus provided is of sufficient width to provide an area large enough to enable the draft in the air space, later described, to overcome the velocity of exit of the hot "air" from the opened oven door and effectively entrain this hot "air" for discharge through the stack. The top of the door and the lower edge of the oven wall at the top of the opening lie adjacent each other. A piece of asbestos tape 36 is secured to the under side 37 of the top of opening so that when the door 29 is closed its upper edge 38 lies against the tape and seals the joint against leakage of hot gases.

The bottom edge 39 of the door lies inside the oven wall at the bottom of the opening 28 and extends below the opening. A piece of asbestos tape 40 is secured to the lower edge of the door and projects forward against the inner surface of the oven just below the opening 28. This forms a seal at the bottom of the door to prevent the escape of hot gases.

A plate 41 is secured to the top edge of the door 29 and projects forward from it. When the door is closed this plate is kept cool by a circulation of air as will be described later. When the door is fully open it drops inside the oven just below the opening 28 and the plate 41 rests on top of and overlies the oven wall at the lower edge 42 of the opening. A handle 43 is hinged to the front edge of the plate 41 at the center thereof by means of a bracket 44 at each end of the handle. These brackets each have a projection 45 formed on the side adjacent the oven. When the door is in the lowermost or open position these projections or lugs 45 catch under the lower edge of the angle iron sill 46 of the opening. The brackets 44 are so shaped that their weight together with that of the handle 43 tends to swing the lugs in against the oven.

When the door is open and the baker is loading and unloading the oven he has a relatively cool surface to work over, the plate 41, which makes it more agreeable as well as eliminating the danger of burns. The plate 41 also receives all of the wear and damage incident to loading or unloading the oven or rapping the pans on the sill to loosen the loaves. When the door is shut the worn and battered surface of the plate 41 is out of sight and the sill 46 of the opening presents a neat appearance.

The door 29 remains closed without any latch because the door is slightly over balanced by the counterweight 35 in this position. Due to the way in which the door is mounted the center of gravity or center of mass of the door is nearest the pivot point when the door is in the closed position and the center of mass of the counterweight is farthest from the pivot point in this position. As the door is swung down into the open position its center of mass moves farther from the pivot point while the center of mass of the counter weight moves nearer the pivot point. The result is that in the open position the door over balances the counterweight and would remain open until moved to the closed position. The latch is provided merely as a safety feature to prevent any possibility of the door swinging shut when the oven is being loaded or unloaded and also to preclude any bouncing of the door when the pans are rapped.

Figure 1:
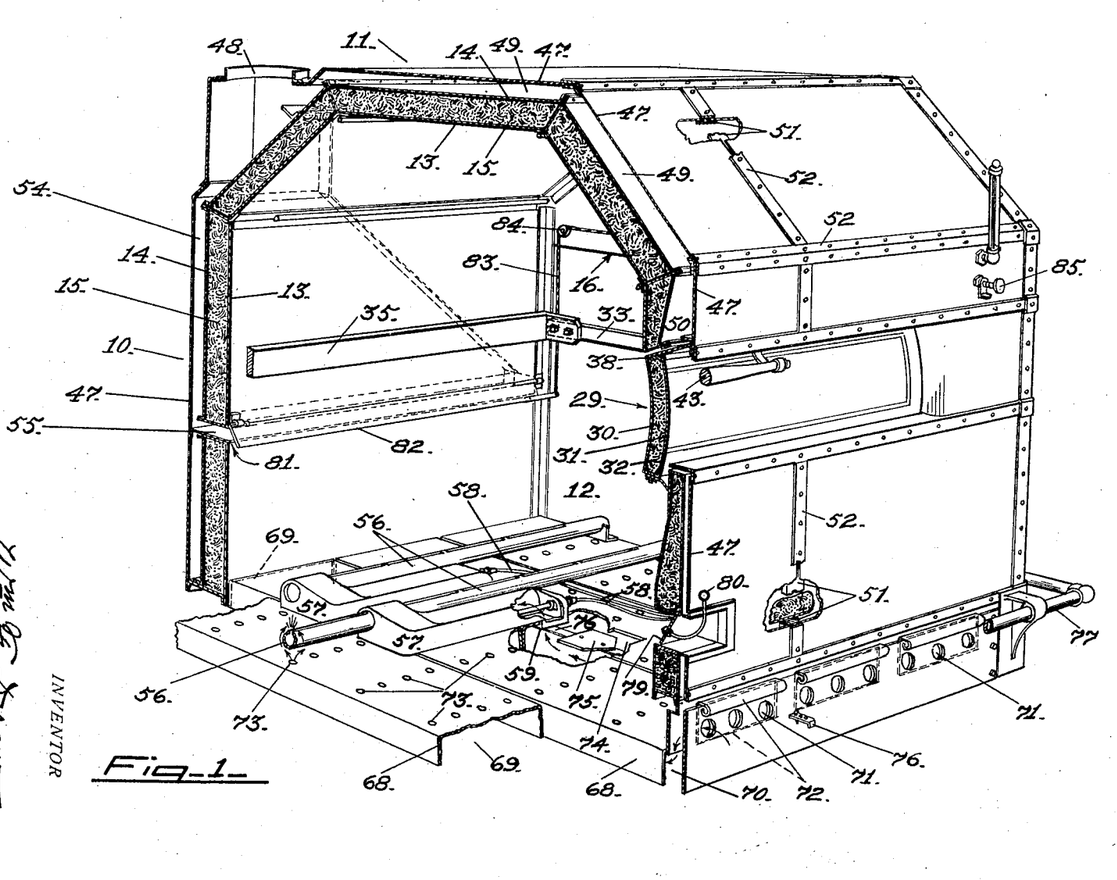
Figure 1 is a perspective view of a vertical section of the oven without the reel in place and showing the details of the burner system and air supply as well as the details of the general oven construction used in the preferred embodiment of this invention.
Figure 2:
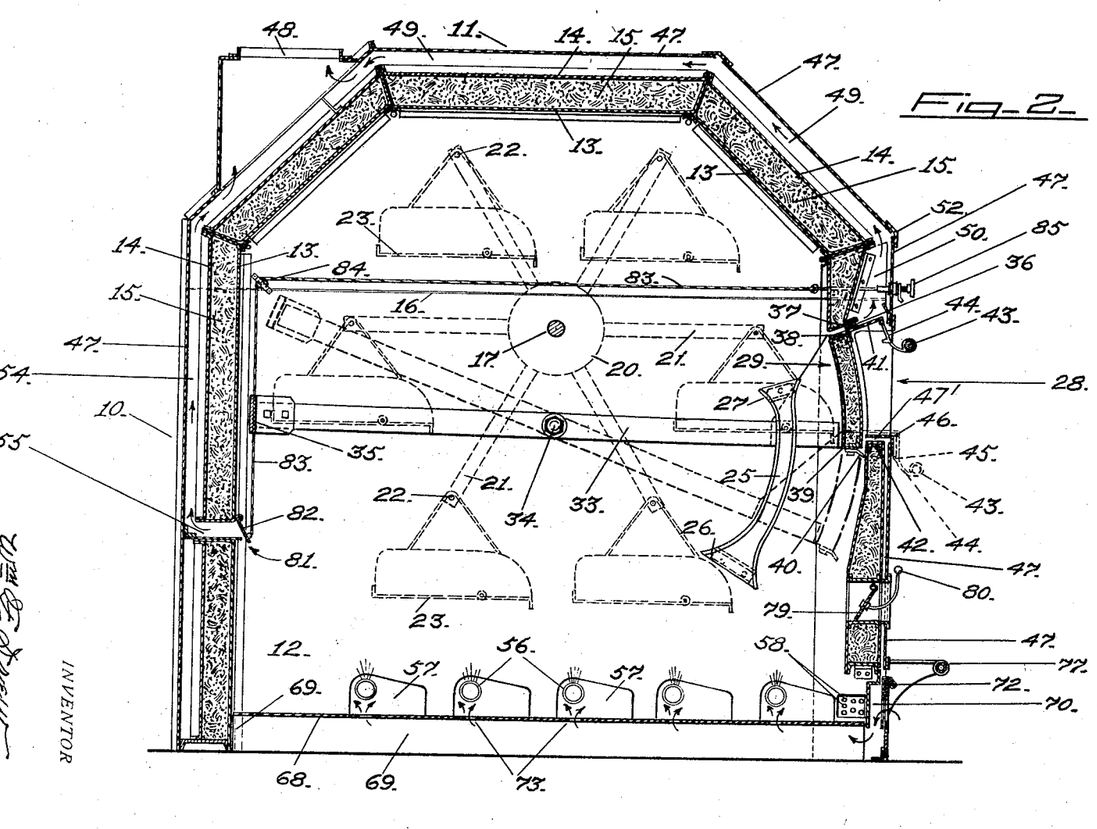
Figure 2 is a vertical section through the oven with the reel in place showing the construction details more fully and also showing the details of the door mounting.
Figure 3:
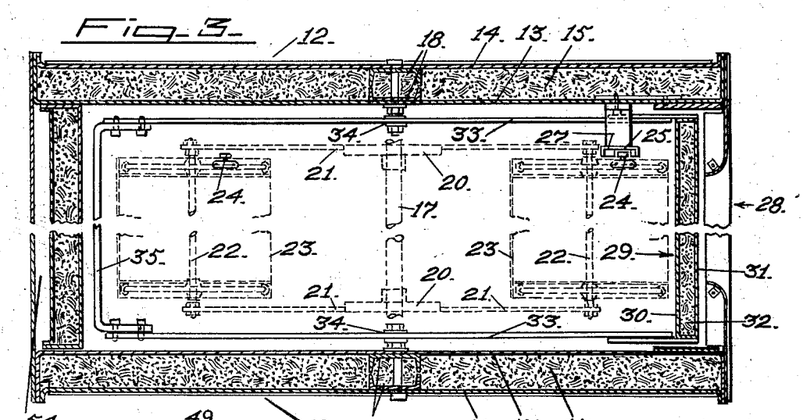
Figure 3 is a horizontal section, with the middle portion broken away, showing the details of the door mounting and the guide mechanism for the trays as well as the general structural details of the oven.
Figures 4, 5, 6:
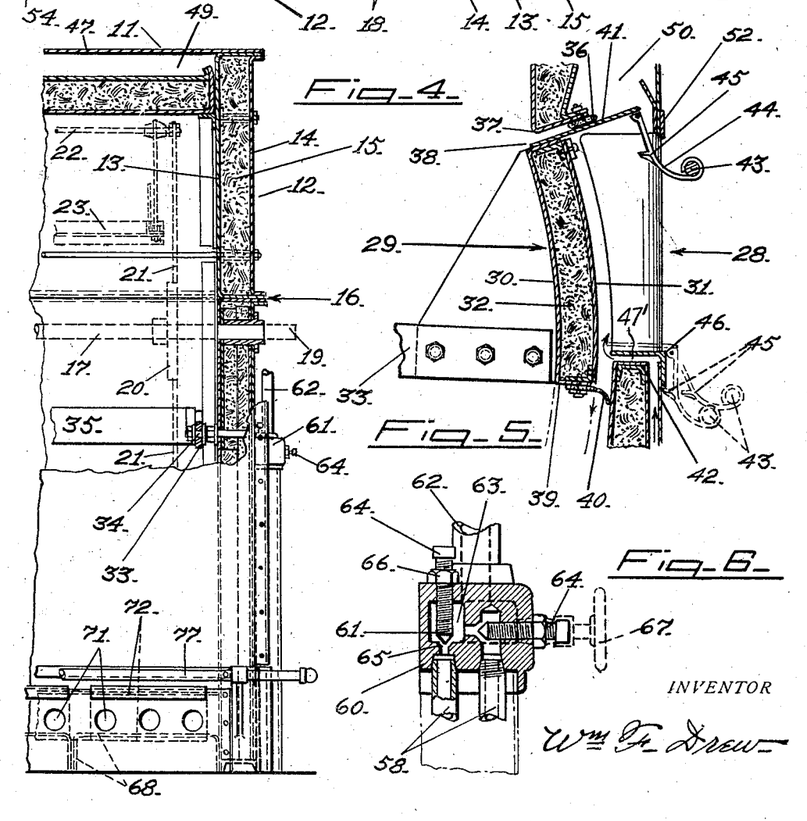
Figure 4 is a fragmentary front view of the oven, partly in section, showing details of the general structure.
Figure 5 is a vertical section through the door showing the details of the latch, auxiliary sill and sealing means.
Figure 6 is a section of the burner regulating valve showing the means of regulating each burner from the central regulating valve.

The front, top and back of the oven is provided with an outer sheet metal shell or housing 47 spaced from the inner insulation filled oven walls proper to provide an air passage between the two at the front and top and to act as a flue for the products of combustion at the back. This space connects with the flue opening 48 so that a constant stream of air is drawn up through the space over the front of the door and the auxiliary sill 41 and under the main sill 46 which is spaced from the top of the lower insulated section as shown in Figure 2, thereby forming an air passage 47' under and in back of the main sill 46 to keep them cool at all times. Any hot gases which may leak around the door are immediately drawn up into this air space 49 through the enlarged opening 50 over the door so that none of it escapes to the room to heat the room or fill it with vapors.

When the door is opened the contact is first broken at the top and the rush of hot gases is drawn up into the opening 50 and carried away as are the hot gases emerging while the door is open. With this arrangement the baker does not have to stand in a constant blast of hot noxious gases while he is loading and unloading the oven. This not only adds to his comfort but is a material benefit to his health as the continual breathing of the noxious gases is very injurious.

This outer sheet metal shell or housing 47, forming the air and flue space above defined, consists of unit metal sheets. The united sheets forming the back and top of the shell or housing are of sufficient length to overlie and be supported by the insulated end walls and be secured thereto by suitable means as bolts or metal screws. To accomplish the formation of the air and flue space (front, top and back) formed by the addition of the shell or housing sheets in the manner described; the end walls are constructed to project beyond the assembled form or contour of the back, top and front insulating wall proper the sections of which abut the insulated end sections. By this means a margin equaling the desired air space is formed by the assembled shell sheets overlying, supported by and secured by suitable means to the periphery of the end sections. The front portion of the shell consists of unit sheets of the desired "finish" as enamel. For the purpose of applying these sheets, more especially those having a vitrified enamel finish, in a manner such as to prevent marring of the surface in the process of assembling and facilitate repair in the event of damage, the sheets are of relatively small size. The size and form of these sheets being determined in such a manner as to define the desired appearance of the oven front as a system of panels. The sheets are secured together and to the oven structure by means of the "backing" strips or frame work 51 underlying the joint of adjacent but not abutting edges of the sheets which are clamped together and in place by a superimposed "panel" or "trim" bar 52 secured to the backing strip or frame 51 by means of bolts or screws which pass between the adjacent edges of the sheets and through or into the backing strip or frame 51. By this means the raw edges of the sheets are covered also. The ends of the front ensemble shell or housing overlie, are supported by, and secured to (by suitable means as bolts or screws) the periphery of the insulated end wall.

Figures 7, 8, 9, 10, 11:
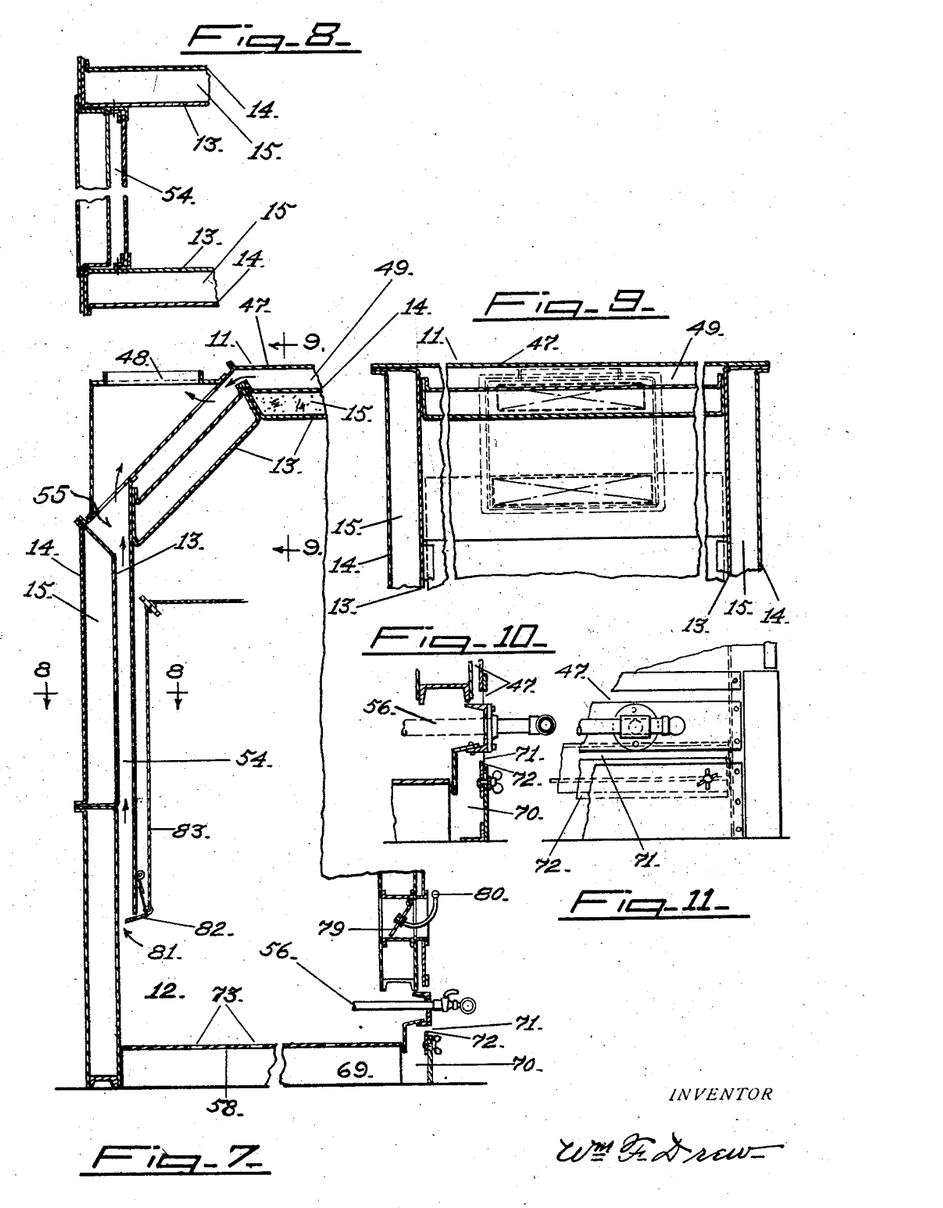
Figure 7 is a fragmentary transverse vertical section of the oven showing a slightly modified stack construction.
Figure 8 is a fragmentary horizontal section on line 8—8 of the modified form of the oven as shown in Figure 7.
Figure 9 is a longitudinal vertical section on line 9—9 of the modified form shown in Figure 7 with parts broken away.
Figure 10 is a fragmentary detail of the oven construction and air regulating shutters for a transverse or fore and aft arrangement of the burners.
Figure 11 is a fragmentary front elevation of the construction shown in Figure 10.

The flue 54 may be made outside of the insulation filled portion of the oven as shown in Figure 2 or it may be made inside this insulation filled portion as shown in Figures 7, 8 and 9. In the latter case the waste gases are led to the stack connection 48 through an opening 55 in the main body of the oven provided at the joint between two of the preformed sections.

The burners consist of tubes 56 usually running lengthwise of the oven near the bottom although they may be run from the front to the back as shown in Figures 7, 10 and 11. These tubes have openings of the proper shape and size formed in their upper surface through which the mixed air and gas emerges and is burned. Each burner tube is supported near its center by a mixing chamber 57 which is L shaped. The burner tubes are secured to the short leg of mixing chamber and the gas is injected into the end of the long leg of the mixing chamber through a pipe or tube 58. Air is supplied to the mixing chamber through an opening 59 in its underside at the outer end of the long leg. The tubes or pipes 58 pass outside the oven at one end near the front and each leads to a separate opening 60 in the bottom of the regulating valve body 61. A pipe 62 supplies gas to a central chamber 63 within the valve body and cone pointed regulating screws 64 in conjunction with the corresponding seats 65 on the passages leading to the tubes 58 provide a means for regulating the proportional flow of gas to each burner. The regulating screws are locked in adjustment by lock nuts 66. A master valve, not shown, is provided in the supply pipe 62 to regulate the total amount of gas supplied to the oven and to shut off the flow of gas. If desired hand wheels 67 may be provided on the adjusting screws 64 but this is not considered advisable under ordinary conditions as the proper regulation of the burners will be destroyed by unwarranted manipulation of the regulating screws.

If desired a thermostatically controlled valve may be placed in the supply line 62 so that the supply of gas to the burners will be regulated by a master valve operated by a thermostat in the oven and the proper baking temperature will be maintained very closely. This would mean not only more uniform and better baking but a greater fuel economy for the oven.

The bottom of the oven is covered with inverted channels or tunnels 68 which run from the front to the back of the oven. The rear ends of the spaces 69 under the tunnels are closed by the back wall of the furnace while the front ends of the spaces or ducts are in communication with the air inlet duct 70 across the front of the oven at the bottom. Openings 71 are formed in the front wall of the inlet duct 70 and shutters 72 may be moved laterally to vary the effective area of the openings 71 and so control the supply of air to the duct 70.

The channels or tunnels 68 have holes 73 in their upper surfaces just under each burner tube 56. The air emerging from the duct 69 into the oven enters directly under each burner tube and is immediately heated as well as supplying an excess of air for the burning gas. In this way the gas is always completely consumed and no cold air ever enters into the baking space of the oven.

The mixing chambers 57 rest on top of the channels or tunnels 68 and are supported by them. The air inlet openings 59 in the lower face of the mixer chambers register with openings 74 in one of the channels and air is supplied through them for mixture with gas. Sliding dampers 75 are provided for the openings 74 to regulate the amount of air supplied to the mixing chambers. These dampers are controlled by a rod 76 to which they are fastened and which extends through the front wall of the oven. A foot rail 77 is provided around the bottom of the oven to protect the damper and air regulating shutters from damage or disturbance by being hit by the trucks carrying the pans.

An opening 78 is provided in the front wall of the oven just over the burners for lighting them and is closed by a door 79 having its upper edge hinged to an oven wall door frame and having an operating handle 80 extending outside the oven. The door is opened by a downward thrust on the operating handle and is closed by its own weight.

The hot gases and products of combustion leave the oven through an opening 81 in the rear of the oven its position differentiating the zones of heat application as and for the purpose above defined.

This opening is controlled by a damper 82 operated by a cable 83 which passes upward over a pulley 84 to an operating handle 85 in the upper front face of the oven. This damper controls the draft from the oven to the stack.

The pre-formed and factory filled insulated sections of the oven are joined together in various combinations and arrangements by means of the joints shown in Figures 12 to 27 inclusive. By using this novel joint it is possible to make the complete sections at the factory and assemble them quickly and easily on the job without producing the unsightly litter that results when the sections must be filled as the oven is being assembled. This joint is at the same time very convenient to use and economical to produce. It also allows for the expansion and contraction of the parts or breathing of the oven in service. This expansion and contraction is often very hard to take care of with the ordinary type of construction and necessitates expensive construction. All these difficulties and disadvantages are eliminated by the use of this new and novel joint.

Figures 23, 24, 25, 26, 27:
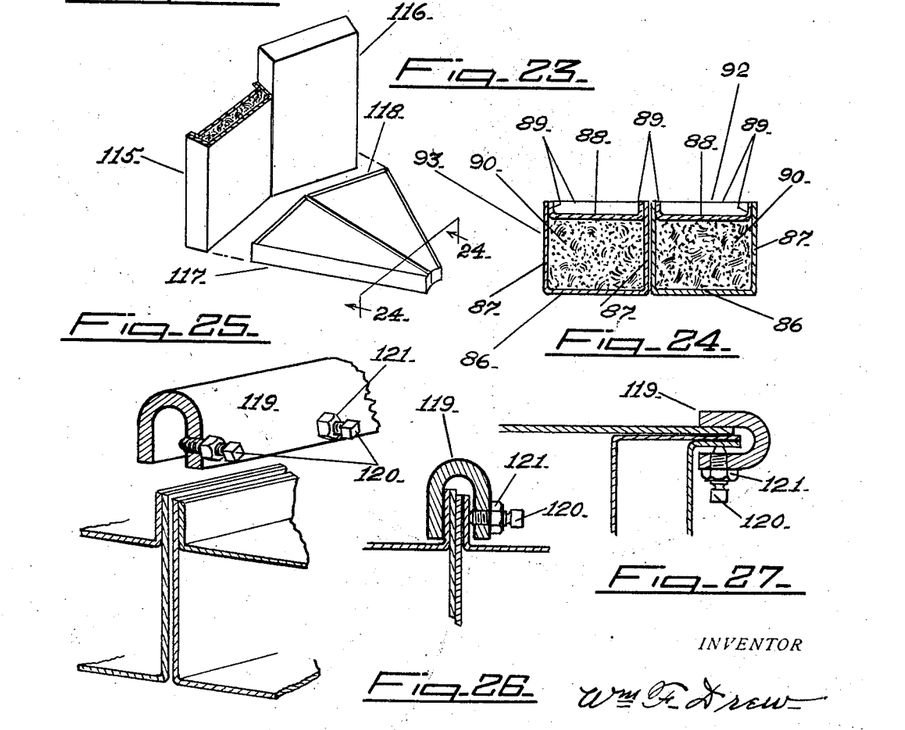
Figure 23 is an exploded perspective view of the method of joining hollow or insulated sections by means of my novel joint to form a polyhedrical or substantially cylindrical structure.
Figure 24 is a section on line 24—24 of Figure 23 showing the use of my novel form of joint to join together two sections when they lie in the same plane.
Figure 25 is a fragmentary perspective view of a slightly modified form of my novel joint for securing together two hollow or insulated sections, showing the use of a different type of binder strip.
Figure 26 is a sectional view of the completed joint shown in Figure 25.
Figure 27 is a section of the modified type of joint used to secure a plain sheet to a hollow or insulated section by using the modified type of binder strip.

The type of construction employed when using this joint is shown in its simplest and basic form in Figure 24. One sheet of metal 86 is formed with deep flanges 87 bent up on all sides, the depth of the flanges governing the space desired for reception of insulation or for other desired purposes. These are simply straight flanges bent up at the desired angle, as a right angle, to the main sheet and of the required depth. A second sheet of metal 88 is formed with shallow flanges 89 on all of its sides. These flanges are also simple straight flanges turned up at the angle required to match the angle of the deep flanges, as a right angle, to the main sheet and of the required depth. This second sheet 88 is of the proper size such that when the flanges 89 are turned up to the required depth the resultant formed sheet will just slip inside the flanges 87 of the sheet 86.

The sheet 86 with its flanges 87 is like a large square, oblong or other desired form pan and this pan is filled to the required depth with any desired insulating material 90 such as mineral wool, asbestos fibre, diatomaceous earth or any other heat insulating material commonly used for this purpose. In practice I find that rock wool gives the best results and employ a finished thickness of about four inches. When this insulating material has been placed in the "pan" and carefully leveled off to a uniform depth, the second sheet 88 is placed on top of the insulating material with its sides also uppermost, like the bottom "pan". This top sheet is then pressed down, compacting the insulating material to the proper depth. The upper edges of the flanges 87 and 89 are then approximately even with each other. These flanges fit tightly against each other and the assembled parts are held together by occasional flush rivets or other suitable means as interlocking extruded or otherwise formed portions of the abutting flanges or by "tack" welding the flanges 87 and 89 together. This may be done by electric spot welding or by tack welding the edges in any ordinary and usual manner as with an oxy-acetylene torch or by electric welding.

After the flanges are secured together in the manner described the section is a single unit and may be readily handled and transported without coming apart or losing any of the insulating material.

The flanges 89 are made deep enough so that holes 91 may be punched or drilled through the two joined flanges. In assembling the sections two sections such as 92 and 93 are placed with a side of one abutting a side of the other and are secured together by bolts passing through the holes 91 in the flanges. This fastens them firmly together and at the same time provides a ready and easy means of dis-assembling them if it should be necessary or desirable to do so at any future time.

If this joint is on a face that is exposed it may be given a finished appearance by placing a U shaped strip 94 over the joint. This strip is also provided with properly spaced holes 95 of the proper size and the sections are joined by bolts 96 passing through the holes in this strip and the holes in the flanges of the assembled sections. By using this finishing strip 94 the joint may be made to present a pleasing appearance and the upper edges of the various flanges may be left slightly uneven without producing an unsightly joint. This does away with the necessity of trimming the edges of the sheet before bending or the flanges after they have been turned up and materially reduces the cost of construction.

By joining the sections on one edge in this manner and in a plane at an angle to the section the bolts or other fastening members are easily inserted and tightened after the sections have been assembled. At the same time the sections are free to move slightly with respect to each other, in the plane of the section, to accommodate expansion and contraction. This movement is accomplished by a slight giving or bending of the flanges as the sections move. At the same time the joint is maintained perfectly tight at all times which is not the case with other simple joints.

Figure 12:
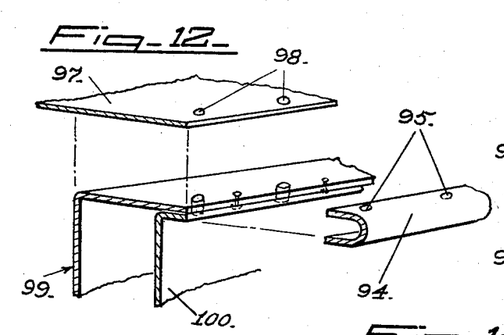
Figure 12 is a fragmentary perspective view of the joint used to unite an insulating section and a plain sheet of metal showing the parts in their relative position before assembly.
Figure 13:
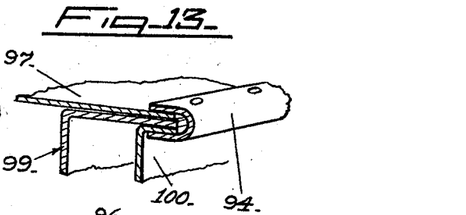
Figure 13 is a fragmentary perspective of the joint shown in Figure 12 showing the elements assembled.
Figures 14, 15, 16:
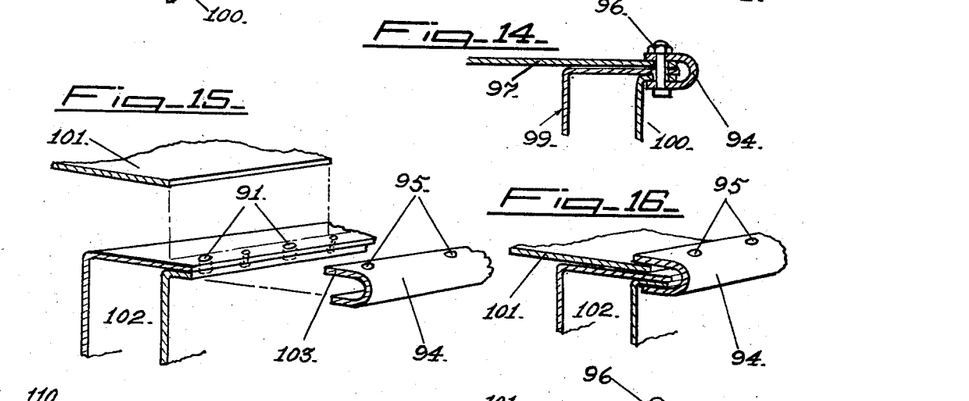
Figure 14 is a section through the completed joint of Figure 13.
Figure 15 is a fragmentary perspective view of the relation of the elements of the joint used to unite an insulating section and a sheet metal section where it is desired not to punch the sheet metal section as when it is enameled.
Figure 16 is a fragmentary perspective view of the assembled elements of the joint shown in Figure 16 showing a plain sheet held under the edge of the binding strip.

When it is desired to joint a sheet of plain metal 97 to one of the pre-formed sections, as shown in Figures 12 to 14 inclusive, the plain sheet is provided along its edge with properly spaced holes 98 and is placed against the edge of one of the pre-formed sections with the holes registering with the holes 91 of the pre-formed section. A U shaped finished strip 94 is placed over the joint and bolts 96 are inserted through the registering holes in the various elements. The plain sheet 97 may be joined to the pre-formed sections at right angles as shown or it may be flanged to the required depth and joined to the pre-formed section so as to conform to the surface 99 or the surface 100 by making the flange on the sheet 97 of the proper depth.

Figures 17, 18, 19, 20:
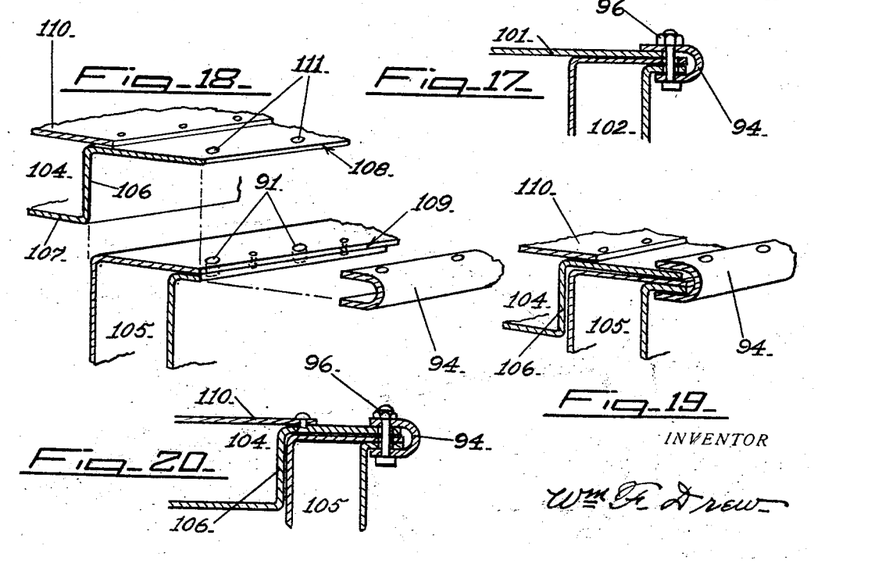
Figure 17 is a fragmentary section of the completed joint shown in Figure 16.
Figure 18 is a fragmentary perspective schematic view of the elements entering into the novel type of joint used to join two hollow or insulated sections at substantially right angles to each other.
Figure 19 is a fragmentary perspective view of the joint shown in Figure 18 with the elements in place.
Figure 20 is a fragmentary cross section of the completed joint shown in Figure 19.

When an enameled sheet 101 is to be joined to a pre-formed section 102, as shown in Figures 15 to 17 inclusive, the enameled sheet is not provided with holes along its edge to register with the holes 91 in the flange of the pre-formed section 102. The sheet 101 is made of such a size that when it is assembled with the section 102 it lies against one end of the section with its edge entirely clear of the holes 91 through the flange of the section. A U shaped finishing or clamping strip 94 is placed over the flange of the section 102 and has one leg 103 longer than the other to extend over the enameled sheet 101. When the bolts are tightened in the registering holes 95 and 91 the leg 103 of the finish strip is pulled down against the enameled sheet 101 and clamps it in place against the end of the section 102. This enameled sheet 101 may also be joined to the section 102 in the general plane of the section by bending the edge of the enameled sheet at right angles to the sheet and then clamping it in place as previously described. This construction is less apt to crack the enamel on the sheet 101 than if it were joined as the plain sheet 97 is joined.

When it is desired to connect two preformed sections 104 and 105 together at right angles as shown in Figures 18 to 20 inclusive one section 105 is made as previously described. The other section 104 is made by making a Z shaped bend 106 along the edge of the lower sheet 107. This bend is made so that when the section 104 is placed against the section 105 the edge 108 of the sheet 107 will approximately coincide with the edge 109 of the flange of the section 105. The second sheet 110 of the section 104 is simply placed on top of the upper element of the Z bend and secured to it by riveting or spot welding. This sheet 110 extends only a short distance on the Z bend and does not extend to the edge 108 of the sheet 107. The edge 108 is provided with holes 111 properly spaced to register with the holes 91 in the flange of the section 105. A finish strip 94 is placed over the adjacent edges of the two sections and they are secured together by means of bolts 96 in the registering holes of the sections 104, 105 and the finishing strip.

Figures 21, 22:
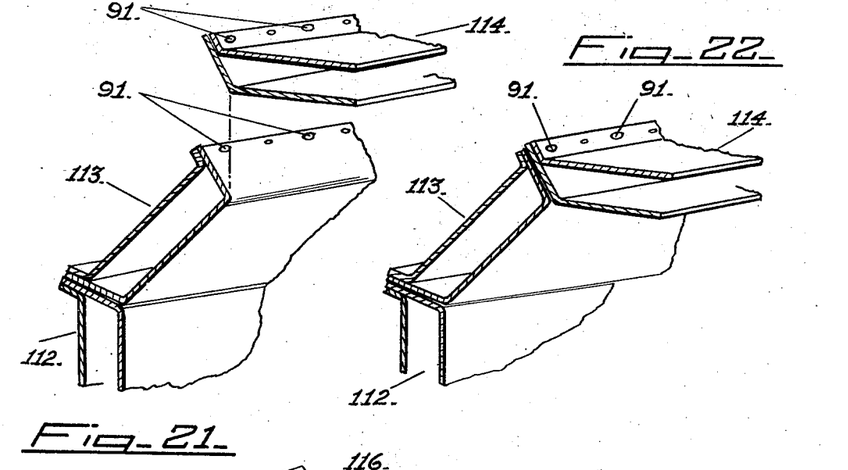
Figure 21 is a partially exploded fragmentary perspective view of the novel type of joint used to secure together two hollow or insulated sections which are at an obtuse angle with each other or when they lie in substantially the same plane.
Figure 22 is a fragmentary perspective view of the assembled joint shown in Figure 21.

If it is desired to join the pre-formed sections at an obtuse angle as shown in Figures 21 and 22 the sections 112, 113 and 114 are made in the same way as a standard section except that the flanges are bent at the required obtuse angle and the sections are joined in the usual manner.

A multi-sided structure with plane ends may be formed as shown in Figure 23 where the sections 115 and 116 are formed with their adjacent flanges bent at an obtuse angle as described above. The sections 117 and 118 forming the plane ends are made in the form of segments rather than as rectangles. The method of constructing the segments and joining them is the same as previously described.

If it is desirable for any reason not to provide holes through the flanges and the finish strip as previously described the adjacent sections may be secured together as shown in Figures 25 to 27 inclusive. A heavy finish strip 119 is provided with set screws 120 threaded in one side of it. This finish strip is slipped over the joint and the set screws are tightened against the flanges of the sections. This forces the adjacent surfaces together and clamps them against the other side of the finish strip, which acts as a C clamp. A lock nut 121 on the set screw prevents it from backing off and allowing the joint to open. This type of construction is very useful at times.

The operation of the oven is as follows: The gas is turned on and off by means of a valve in the main gas supply line which is connected to a distributor located on one end of the oven. In this distributor the gas to each burner is separately adjusted and regulated and is supplied to each burner through a separate tube which delivers the gas into one end of a mixing chamber and the air to be mixed with the gas enters the mixing chamber through an opening in the bottom of the chamber at the end where the gas enters. This air is supplied to the mixing chamber from tunnels running from front to back of the oven and forming the floor of the oven. The amount of air supplied to the mixing chambers is controlled by a sliding damper in the tunnel by means of which the opening to the mixer may be partially closed. These dampers are operated by a handle on the front of the oven near the floor.

From the mixing chamber the mixed gas and air pass to the burner. These burners are preferably in the form of tubes extending from end to end of the oven and connected at their center to the mixing chamber. Suitable openings in the top of the tubes form the burners.

It is apparent that the disposition of the burners does not affect the action of the process effected in the upper portion of the oven chamber, that above the vent, wherein the application of the heated medium is rendered as a "reservoir" or zone of uniformly and thoroughly heat saturated and relatively quiescent heated medium. It is also evident that disposition of the burners does affect the action of the process effected in the lower portion of the oven chamber, that below the vent, wherein the application of the "live" heat is accomplished.

By the above described method of arranging the burners, lengthwise of the oven and parallel to the trays or shelves, effective application of the "live" or convection current heat is obtained with a minimum number of burners. Each tray and the materials thereon, as it passes downward into the live heat zone and momentarily directly over the burners, is subjected to an even application of heat throughout its entire length.

When desired the burners may be run from the front to the back of the oven. It is apparent, however, that to effect an even application of the "live" heat, above defined, a greater number of burners is required as the path of travel of the trays is parallel to the burners and the convection heat currents and the momentary direct heat are applied in strata or "streaks" across the trays which must be overcome by the use of a number of burners close enough together to equalize the "live" heat application.

Holes are provided in the top element of the tunnels under each burner tube. The excess air for complete combustion and that heated by the burning gas is delivered through these openings directly under each burner and immediately mingles intimately with the burning gas and is heated so that no cold air is admitted to the baking space in the oven. The supply of air to the tunnels is controlled by shuttered openings in the front of the oven.

A lighter or "peep" hole opening having a hinged door which swings shut of its own weight, is provided in the front of the oven just above the burners. A torch or any other lighting means is introduced through this opening to light a continuous "pilot" light (not shown) or the burners when the oven is started. As soon as the air inside the oven becomes heated a draft is established up the stack which draws air in around the burners through the air supply tunnels. Since these tunnels form the floor of the oven the air entering through them is heated before it reaches the burners. This adds to the economical operation of the oven as well as providing a heat insulation for the bottom of the oven.

Due to the fact that the opening from the oven to the stack is located, to conserve the objects above defined, near the bottom of the oven a novel and peculiar heating effect is produced. The draft from the burners to the stack does not rise into the upper baking zone of the oven to any great extent but rises in a curve from the burners almost directly to the stack opening. The air in the upper zone is heated almost entirely by radiation and conduction while convection enters but very slightly into the transmission of the heat. The fan like effect of the slowly revolving reel of trays does produce a slight movement of the air in this zone but this effect is almost negligible. As a result the air in the upper zone becomes saturated with heat and provides a heated zone of very uniform temperature in which the baking, drying or other process is effected. The temperature of this mass of heated air is only affected very slightly by variations in gas flow or other disturbances which would produce a variable temperature in this zone if the heated air from the burners rose directly over the reel as it does in the ovens constructed in the ordinary or usual manner. By this means any bands or zones of different temperatures are eliminated and the finished product is evenly baked and has a very uniform and even color which is so desirable.

The draft in the stack draws air through the space along the front and top of the oven between the oven proper and the outside shell of finish sheets. This circulation of air keeps the front of the oven and the sill of the door cool so that there is less liability for the operator to be burned in operating the oven as well as adding materially to his comfort. Any hot gases which may leak from the oven around the door are also drawn through this space into the stack and do not enter the room. When the door is opened the first opening occurs at the top of the door. The rush of hot air from the oven is immediately drawn up through the ventilating space into the stack or chimney. And all the while that the operator is loading or unloading the shelves of the reel the escaping gases are drawn up into the chimney so that he does not have the physical discomfort or unhealthy condition of standing in this stream of hot gases and breathing them.

The door is supported on an arm pivoted inside the oven and swings up and down inside the oven. A counterweight is provided to make the door easy to operate and it is so suspended that it will tend to open or close itself after it has passed the center position. By using this mounting the door is always held firmly closed without the necessity of any form of latch. A latch is provided to hold the door in the open position as a matter of extra safety. A working sill is carried by the top edge of the door and this overlies the sill of the opening to protect it when the oven is being loaded or unloaded. The sill of the opening, therefore, always presents a pleasing appearance and is free from the usual dents, scars and wear incident to dragging the pans over the sill and rapping them on the sill to loosen the loaves.

The foregoing description illustrates the preferred form of my invention but the principles involved may be applied to many other forms of ovens which will lie within the scope of the appended claims.

This structure may be used for many other purposes than baking bread etc. as described. It may be used as a drying oven for drying fruit, vegetables etc., for drying alimentary paste such as macaroni, spaghetti etc., or for any other drying operation where the material being dried would be placed on trays or the like. This oven is particularly well adapted for this service as the amount of moisture or essential left in the material being dried can be readily controlled by varying the location of the vent opening.

When the vent opening is placed near the bottom of the oven the essential oils would be held in the upper zone of the oven and would subject the materials processed to the action of these essentials and as the vent opening is moved up towards the top the amount of moisture or essential oils retained in the material being dried is reduced.

The structure is also very satisfactory as an enameling or annealing oven as the temperature through which the material being treated passes is very uniform without the usual bands or zones of different temperatures or the deleterious effect of drafts of relatively cool air upon the heated objects.

The structure may also be used as a disinfecting oven in which the material may be treated by heated air alone or heated air into which some sort of disinfecting material is introduced, or disinfecting material may be introduced alone into the casing to treat the material therein.

The foregoing are illustrative of some of the many uses to which this structure may be advantageously put without attempting to describe them all or limit the structure to any specific use or uses.

I claim:

1. In an oven having a casing and material supporting means within the upper portion thereof: of burners within said casing near the bottom thereof; a mixing chamber for each burner and adjacent thereto; valve means without said casing adapted to independently vary the supply of fuel to each burner, said valve means having a single unitary body; a fuel supply pipe connected to said body; tubes independently connecting said body with the mixing chamber of each of said burners, a duct in the casing, under the burners, supplying air to each of mixing chambers; an intake opening in said duct outside said casing and means controlling the supply of air from said duct to each of said mixing chambers.

2. In an oven a casing composed of preformed unitary insulation filled sections detachably secured together; an outer shell secured in spaced relation to said casing and forming a continuous unobstructed vent space thereabout; material supporting means within the upper portion of said casing; burners in the lower portion of said casing near the bottom thereof; a stack; a vent spaced from the top of said casing and connected to said stack; and a means connecting said space between said casing and outer shell with said stack as and for the purpose specified.

3. In an oven a casing composed of preformed unitary insulation filled sections detachably secured together; an outer shell secured in spaced relation to said casing and forming a vent space thereabout, said vent space extending over substantially the entire front of said casing; material supporting means within the upper portion of said casing; burners within said casing near the bottom thereof; a vent stack for said oven; a connection between said vent stack and said oven near the bottom of said oven; a loading opening in one wall of said oven opposite said pan supporting means; a closure member for said opening pivotally mounted within said oven for arcuate movement across said opening; an opening in said vent space over said loading opening and a connection between said vent stack and said vent space whereby hot air escaping from the oven when said door is opened is drawn through said vent space into said stack as and for the purpose specified.

4. In an oven an inner casing; an outer shell secured in spaced relation to said inner shell; a loading opening through said casing and outer shell; a door for said opening, a sill for said openings; openings in said outer shell at the bottom thereof admitting air from without said oven to said space; a passage behind said sill connected to said space and opening in front of said door; an opening into said space over said door; a vent stack; and a connection between said space and said vent stack whereby cooling air is drawn around said sill and over said door as and for the purpose specified.

5. In an oven having a casing and a loading opening therein; a closure member for said opening; arms on said closure member pivotally mounted within said casing for arcuate movement of said closure member across said opening, and a counter-weight uniting the arms of said closure member.

6. In an oven having a casing; burners within said casing near the bottom thereof, abutting inverted channels under said burners forming air ducts; and receiving air from without said casing; openings in the upper surface of said channels under said burners and a vent opening in said casing below the top thereof.

7. In an oven having a casing; burners within said casing near the bottom thereof; abutting rectangular air ducts under said burners and receiving air from without said casing; openings in the upper surface of said ducts under said burners and a vent opening in said casing below the top thereof.

8. In an oven having a casing; burners within said casing near the bottom thereof; abutting air ducts under said burners forming the floor of said casing and receiving air from without said casing; openings in the upper surface of said ducts under said burners; a vent opening in said casing spaced from the top thereof and extending substantially the length of said casing; and a shutter adapted to vary the effective area of said vent opening.

9. In a bake oven having a casing; an opening in a wall of said casing; an arcuate door within said casing adapted to close said opening; arms attached to either end of said door and extending substantially radially therefrom and substantially parallel to the inner surface of the end walls of said casing; means pivotally supporting said arms substantially intermediate their length and a unit counterweight secured to the ends of said arms opposite said door; a sill along the lower edge of said opening; a handle pivoted to the outer surface of said door near the top thereof; and means on said handle adapted to latch under said sill when the door is in the open position.

10. In a bake oven having a casing; an opening in a wall of said casing; an arcuate door within said casing and adapted to close said opening; arms secured to said door at each end thereof and extending parallel with the end walls of said casing, inside said casing; pivot pins intermediate the ends of said arms and supported within said casing so that said arms are substantially horizontal when said door is in the closed position; and counterweights on the ends of said arms opposite said door; a sill along the lower edge of said opening; a handle pivotally secured to the outer surface of said door near the top thereof; and means on said handle adapted to latch under said sill when said door is in the open position.

11. In an oven casing; said casing composed of a plurality of pre-filled unit insulation sections; said insulation sections comprising a deep flanged member and a shallow flanged member maintained in fixed spaced relation to each other by uniting said flanges; a plurality of said sections united longitudinally at said flanges to form the longitudinal ensemble of said oven casing within a longitudinal shell; preformed end sections for said casing; the ends of said oven casing abutting against and supported by said end sections of said oven casing; said longitudinal ensemble of said oven casing and said end sections of said oven casing being maintained in fixed relative relation by clamping means.

12. In an oven casing; said casing composed of a plurality of pre-filled unit insulation sections; said insulation sections comprising a deep flanged member and a shallow flanged member maintained in fixed spaced relation to each other by uniting said flanges; a plurality of said sections united longitudinally at said flanges to form the longitudinal ensemble of said oven casing within a longitudinal shell the space thereinabout in communication with the interior of the baking chamber formed by said casing; preformed end sections for said casing the ends of said oven casing abutting against and supported by said end sections of said oven casing.

13. In an oven casing; said casing composed of a plurality of pre-filled unit insulation sections; said sections comprising a deep flanged member and a shallow flanged member maintained in fixed spaced relation by uniting said flanges; a plurality of said unit sections united longitudinally at said flanges to form the longitudinal ensemble of said oven casing; preformed end sections for said casing the ends of said longitudinal ensemble of said oven casing abutting against said end sections of said oven casing forming a margin relative to the periphery of said end sections of said oven casing and a shell secured to the periphery of said end sections, the space therein in communication with the interior of the baking chamber formed by the said casing.

14. In an oven; an insulation member forming the longitudinal structure of a baking chamber; said longitudinal structure abutting against insulation end members completing a baking chamber; said longitudinal insulation member abutting against said insulation end members to form a margin relative to the periphery of said end members and a shell secured to the periphery of said end members for the purpose described.

15. In an oven: an inner casing having a door therein; an outer shell secured in spaced relation to said casing; a vent opening through said casing into said space near the bottom thereof; an opening over said door communicating with said space and a flue opening in the upper portion of said space.

16. In an oven: an inner casing having a door therein; an outer shell secured in spaced relation to said casing; a vent opening through said casing into said space near the bottom thereof; an opening over said door communicating with said space and openings in the front of said shell near the bottom thereof adapted to admit cold air to said space.

17. In an oven: an inner casing having a door therein; an outer shell secured in spaced relation to said casing; a flue communicating with said space at the top thereof; said space serving as a vent for the products of combustion from said oven and to exhaust the hot gases escaping through said door opening.

18. In an oven having a casing composed of pre-formed, unitary, insulation filled sections detachably secured together and an outer shell composed of sheets secured to said casing; a flange formed on said insulated section, a sheet lying against said flange and having its outer edge not in register with the outer edge of said flange; a U shaped clamping member having unequal legs, the longer leg extending over said sheet and means securing said clamping member to said flange and clamping said sheet in place.

In testimony whereof I have signed my name.

WILLIAM F. DREW.